(12) United States Patent
Littlejohn et al.

(10) Patent No.: US 8,600,813 B2
(45) Date of Patent: *Dec. 3, 2013

(54) TECHNIQUE OF PROVIDING TARGETED MEDIA ITEMS

(75) Inventors: Jeffrey Lee Littlejohn, Alexandria, KY (US); James P. Lambert, Toluca Lake, CA (US); Mark DuVall, Torrance, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/021,882

(22) Filed: Feb. 7, 2011

(65) Prior Publication Data

US 2011/0131272 A1 Jun. 2, 2011

Related U.S. Application Data

(63) Continuation-in-part of application No. 09/854,319, filed on May 11, 2001, now Pat. No. 7,890,368.

(51) Int. Cl.
*G06Q 30/00* (2012.01)

(52) U.S. Cl.
USPC ............... 705/14.66; 705/14.4; 705/14.41; 705/14.49; 705/14.54; 705/14.55; 705/14.72; 705/14.73

(58) Field of Classification Search
USPC .......... 705/14.4, 14.41, 14.49, 14.54, 14.55, 705/14.72, 14.66, 14.73
See application file for complete search history.

(56) References Cited

U.S. PATENT DOCUMENTS

| | | | |
|---|---|---|---|
| 5,778,187 A | 7/1998 | Monteiro et al. |
| 5,822,735 A | 10/1998 | De Lapa et al. |
| 5,983,005 A | 11/1999 | Monteiro et al. |
| 6,035,280 A | 3/2000 | Christensen |
| 6,119,163 A | 9/2000 | Monteiro et al. |
| 6,185,541 B1 | 2/2001 | Scroggie et al. |
| 6,324,519 B1 | 11/2001 | Eldering |
| 6,757,662 B1 | 6/2004 | Greenwald et al. |
| 6,885,994 B1 | 4/2005 | Scroggie et al. |

OTHER PUBLICATIONS

Shermach, Kelly, Electronic Coupon Program Offers Data-Base Potential, Sep. 25, 1995, Marketing News, 1.

*Primary Examiner* — Raquel Alvarez
(74) *Attorney, Agent, or Firm* — Garlick & Markison; Edward J. Marshall

(57) ABSTRACT

A first message from a client device, received at a server, can include a request to provide at least one media item matching at least one audience parameter. In response to the first message, the server can access a database storing media item information associated with multiple media items to be retrieved using servers other than the server receiving the first message. The media item information can include, a media item identifier, a media item location identifier, and description information. Media items are selected based on a comparison of the audience parameter with the description information and the server sends a reply to the first message, including a list of media items and their location identifiers.

20 Claims, 7 Drawing Sheets

TECHNIQUE OF PROVIDING TARGETED MEDIA ITEMS

CROSS REFERENCE TO RELATED APPLICATIONS

This application is a continuation in part of U.S. application Ser. No. 09/854,319, filed May 11, 2001, and entitled "TECHNIQUE OF PROVIDING TARGETED INFORMATION," which is incorporated herein in its entirety by reference for all purposes.

FIELD

This invention relates in general to computer implemented systems, and more particularly, to a technique of providing targeted information.

BACKGROUND

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information. The Web browser then sends the URL request to the Web server software using Hypertext Transfer Protocol (HTTP). In response to the URL request, the Web server software locates and returns the requested information to the Web browser.

The Web contains Web pages that incorporate text, graphics, sound, animation, and other multimedia elements. Many Web pages are formatted in a language called HyperText Markup Language (HTML). HTML controls the appearance of a Web page. Specifically, HTML controls how information, such as, text, images, and push-buttons are arranged on a Web page. Hypertext links connect the web pages to each other, and to any other pages, graphics, binary files, or multimedia files.

HTML is based on SGML (Standard Generalized Markup Language). SGML allows documents to describe their own grammar—that is, to specify a tag set used in the document, and to specify the structural relationships that those tags represent. SGML makes it possible to define different formats, for your each document; to handle large and complex documents; and to manage large information repositories. Full SGML, however, contains many optional features that are not needed for Web applications.

HTML web pages incorporate a small set of tags in conformance with SGML. In general, HTML is well suited for hypertext, multimedia, and the display of small and reasonably simple documents. HTML is not well suited for large, complex documents.

The World Wide Web Consortium (W3C) created a simplified subset of SGML, specially designed for Web applications, and designed for large and complex documents. This subset is called XML (Extensible Markup Language). XML is independent of any platform, vendor, or application. Therefore, XML can be used to exchange information, without regard to the system that the information is coming from or going to. In addition, XML enables the exchange of information, not only between different computer systems, but it also enables the exchange of information across different languages.

The Web has provided authors, scientist, academics, and other content providers with a vehicle for distributing their works across a global network. Web users, however, seem to view the Web as analogous to basic cable. For cable, people pay a basic rate for the cable connection, and rarely do they pay additional fees for a particular cable show. Similarly, Web users are willing to pay a basic rate for an Internet connection, but they are less willing to pay additional fees for content. Consequently, advertising is one way that the content provider can generate revenue.

Many content providers seek to increase their advertising revenue by targeting advertisements to users, based on variables such as gender, age, geographic location, etc. In general, content providers can justify high advertising rates by showing that a company's advertisements are being viewed by users that would likely purchase the company's product.

Some content providers obtain targeted advertisements from Internet advertisement providers. Typically, a content provider submits demographic requirements to an advertisement provider, and the advertisement provider furnishes the content provider with a single advertisement that satisfies the demographic requirements. Such a system disadvantageously lacks flexibility and restricts the content provider's options to the single advertisement. Thus, there is a need in the art for a technique of furnishing the content provider with advertising options.

SUMMARY

To overcome the limitations in the prior art described above, and to overcome other limitations that will become apparent upon reading and understanding the present specification, the present invention discloses a method, apparatus, and article of manufacture for providing targeted information.

In one embodiment of the present invention, a request for targeted information is received from a user. The request can be encrypted, and the request can have a logon authorization element and a parameter requirement element. When the logon authorization element is satisfied, an encrypted list of data items is transmitted to the user. The list of data items can also be transmitted to the user after using a cookie to anonymously target the user. Each data item satisfies the parameter requirement element. In one embodiment, the data item is an advertisement. In other embodiments, the data item is a media item, including non-advertisement content. The data item can be retrieved by a consumer or content provider using a server that is separate from the server receiving the encrypted request. The data item can also be retrieved using a media stream or a streaming server.

The above-described invention has utility for providing the user with media options that satisfy the user's parameter requirements.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Figure 1:
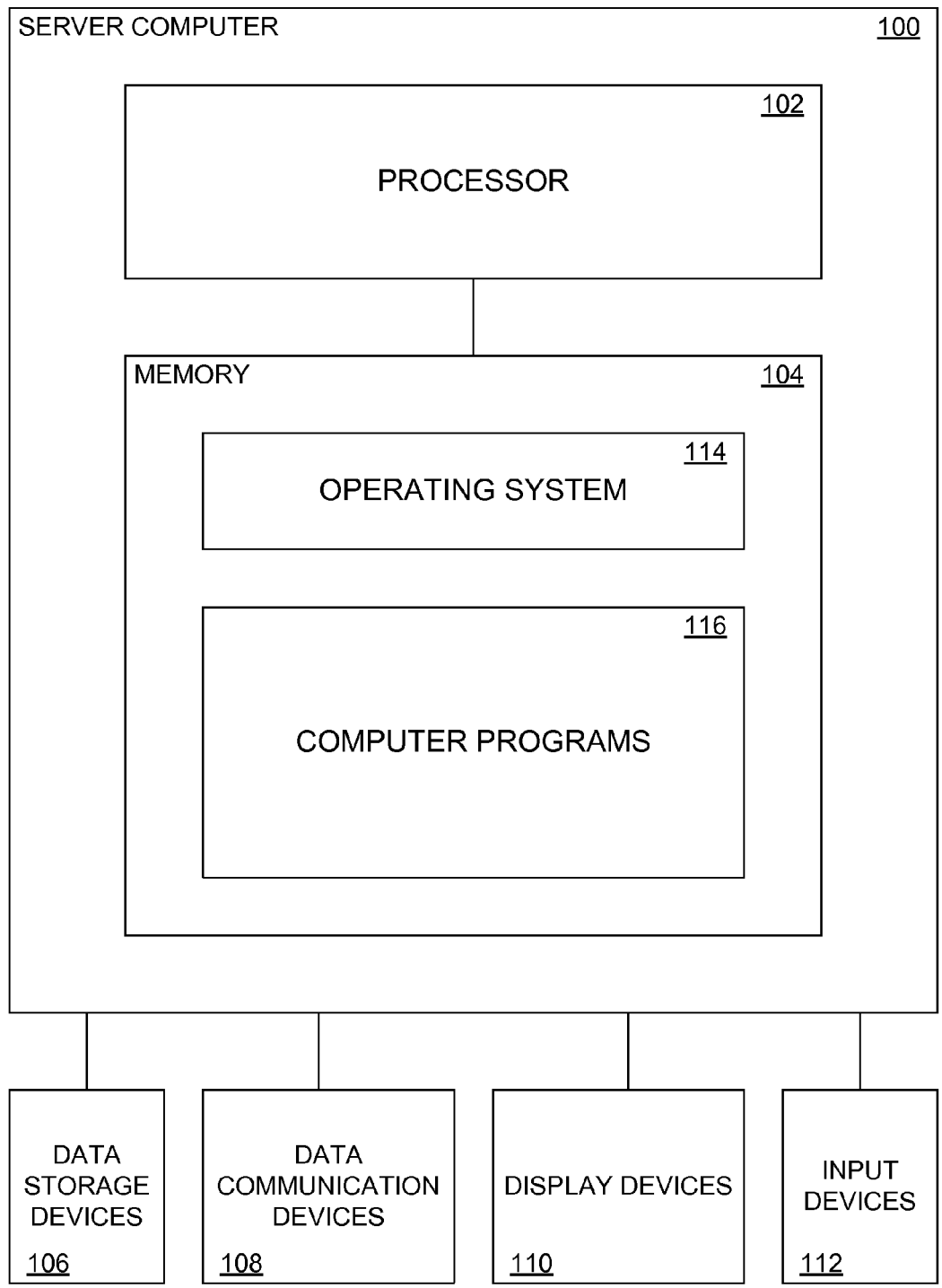
FIG. 1 is a schematic diagram illustrating a hardware environment used to implement a server computer in one embodiment of the invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

One embodiment of this invention is comprised of a collection of components, which will be referred to herein as the "Third Party Advertising System" or "TPAS." It is to be understood that these components may be combined in many different ways to form a variety of combinations within the scope of the invention.

The TPAS enables a user to access a list of targeted advertisement options (also referred to as data items). Initially, the user at a client computer invokes the TPAS. The TPAS then requests logon authorization information from the user. The logon authorization information includes a client identifier (e.g., username and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user is an authorized user, the TPAS system compares the client identification information with logon information contained in a database that is connected to the TPAS server computer. When a match exists, the TPAS returns a limited life span key to the user. This limited life span key provides the user with the ability to encrypt data and decipher encrypted data. The limited life span key is active for a pre-defined time duration (e.g., ten minutes). Alternatively, the TPAS system may place a cookie on the user computer to enable requests for targeted advertisements without requiring logon information, thereby allowing the user to remain anonymous.

The user uses the limited life span key to encrypt a request for targeted advertisement options. The request contains parameter requirements, including audience demographic requirements and/or content requirements. The user sends the encrypted request to the TPAS.

In response to the encrypted request, the TPAS compares the parameter requirements with the description of each advertisement stored in the database. The TPAS then uses XML to create a list which contains each advertisement that satisfies the parameter requirements. Advertisements that satisfy the parameter requirements are referred to as targeted advertisements. Of course, a different mark-up language could be used for the list, such as HTML or SGML, without exceeding the scope of this invention.

Next, the TPAS encrypts the XML list, and returns the encrypted list to the client computer. The client computer uses its limited life span key to decrypt the XML list of targeted advertisements.

At this point, the user may select one or more targeted advertisements from the list. The user can then purchase the selected, targeted advertisements from any advertisement provider. When the purchased advertisements are played and/or displayed, the client computer sends a XML report to the TPAS. Of course, a different mark-up language could be used for the report, such as HTML or SGML, without exceeding the scope of this invention.

One advantageous feature of the TPAS includes providing users with a list of targeted advertisements, wherein, each of the targeted advertisements satisfies the user's parameter requirements. In addition, since XML can be used to exchange information, without regard to the system that the information is coming from or going to, the TPAS can be used with any device or appliance that can transmit and receive a XML communication.

Another embodiment of this invention can include a collection of components, referred to herein as a "Third Party Media Distribution System" or "TPMDS." TPMDS components may be combined in many different ways to form a variety of combinations within the scope of the invention.

The TPMDS can handle the distribution of lists of multiple types of media, including, but not limited to advertisements, music videos, radio programs. Types of advertisements that can be handled and differentiated by the TPMDS can include, but is not limited to promotional advertisements, gateway advertisements, banner advertisements, commercial advertisements, and "jingles." In addition, the TPMDS can handle and differentiate between media of different audio formats, including, but not limited to WAV, WMP, WMA, Real, QT, MP3, Liquid, and Emblaze formats; the TPMDS can also handle media of different file wrapper formats, including, but not limited to RSS formats. For example, the TPMDS enables a user to access a list of targeted media item options (also referred to as data items), and compares parameter requirements with media item information stored in a database. The TPMDS can also handle the distribution of media items using servers other than the server within which the TPMDS is located, including servers transmitting dynamic media streams, as the database can retrieve information on media items to be retrieved using other servers. Finally, the TPMDS can work with client devices other than computers, such as consumer devices, which can include appliances, personal digital assistants (PDAs), wrist watches, stand-alone Internet radios, set top boxes, and television systems. The TPAS enables a user to access a list of targeted advertisement options (also referred to as data items).

Initially, the user at a client computer invokes the TPMDS. The TPMDS then requests logon authorization information from the user. The logon authorization information includes a client identifier (e.g., username and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user is an authorized user, the TPMDS system compares the client identification information with logon information contained in a database that is connected to the TPMDS server computer. When a match exists, the TPMDS returns a limited life span key to the user. This limited life span key provides the user with the ability to encrypt data and decipher encrypted data. The limited life span key is active for a pre-defined time duration (e.g., ten minutes). Alternatively, the TPMDS system may place a cookie on the user computer to enable requests for targeted media items without requiring logon information, thereby allowing the user to remain anonymous.

The user uses the limited life span key to encrypt a request for targeted media item options. The request contains parameter requirements, including audience demographic requirements and/or content requirements. The request can also contain media requirements, including, but not limited to specific media type, including, but not limited to specific audio format and file wrapper format. For example, a user may request targeted commercial spots that are of a specific file wrapper format and audio format. The user sends the encrypted request to the TPMDS.

In response to the encrypted request, the TPMDS compares the parameter requirements with the description of each media item stored in the database. The TPMDS then uses XML to create a list which contains each media item that satisfies the parameter requirements. Media items that satisfy the parameter requirements are referred to as targeted media items. Of course, a different mark-up language could be used for the list, such as HTML or SGML, without exceeding the scope of this invention.

Next, the TPMDS encrypts the XML list, and returns the encrypted list to the client computer. The client computer uses its limited life span key to decrypt the XML list of targeted media items.

At this point, the user may select one or more targeted media items from the list. The user can then purchase the selected, targeted media items from any media item provider. When the purchased media items are played and/or displayed, the client computer sends a XML report to the TPMDS. Of course, a different mark-up language could be used for the report, such as HTML or SGML, without exceeding the scope of this invention.

Before providing the details of the TPAS and the TPMDS, the hardware environments used to implement a client computer, client device, and a server computer in one embodiment of the present invention are discussed.

Hardware

FIG. 1 is a schematic diagram illustrating a hardware environment used to implement a server computer 100 in one embodiment of the invention. The present invention is typically implemented using a server computer 100, which generally includes a processor 102, a random access memory (RAM) 104, data storage devices 106 (e.g., hard, floppy, and/or CD-ROM disk, drives, etc.) data communications devices 108 (e.g., modems, network interfaces, etc.), display devices 110 (e.g., CRT, LCD display, etc.), and input devices 112 (e.g., mouse pointing device, keyboard, CD-ROM drive, etc.). It is envisioned that attached to the server computer 100 may be other devices, such as read only memory (ROM), a video card, bus interface, printers, etc. Those skilled in the art will recognize that any combination of the above components, or any number of different components, peripherals, and other devices, may be used with the server computer 100.

The server computer 100 operates under the control of an operating system (OS) 114. The operating system 114 is booted into the memory 104 of the server computer 100 for execution when the server computer 100 is powered-on or reset. In turn, the operating system 114 then controls the execution of one or more computer programs 116, such as the comparison software for comparing the parameter requirements with available advertisements, and list software for creating a XML list of targeted advertisements. The present invention is generally implemented in these computer programs 116, which execute under the control of the operating system 114, and cause the server computer 100 to perform the desired functions as described herein.

The operating system 114 and computer programs 116 are comprised of instructions which, when read and executed by the server computer 100, cause the server computer 100 to perform the steps necessary to implement and/or use the present invention. Generally, the operating system 114 and/or computer programs 116 are tangibly embodied in and/or readable from a device, carrier, or media such as memory 104, data storage devices 106, and/or data communications devices 108. Under control of the operating system 114, the computer programs 116 may be loaded from the memory 104, data storage devices 106, and/or data communications devices 208 into the memory 204 of the server computer 100 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Figure 2:
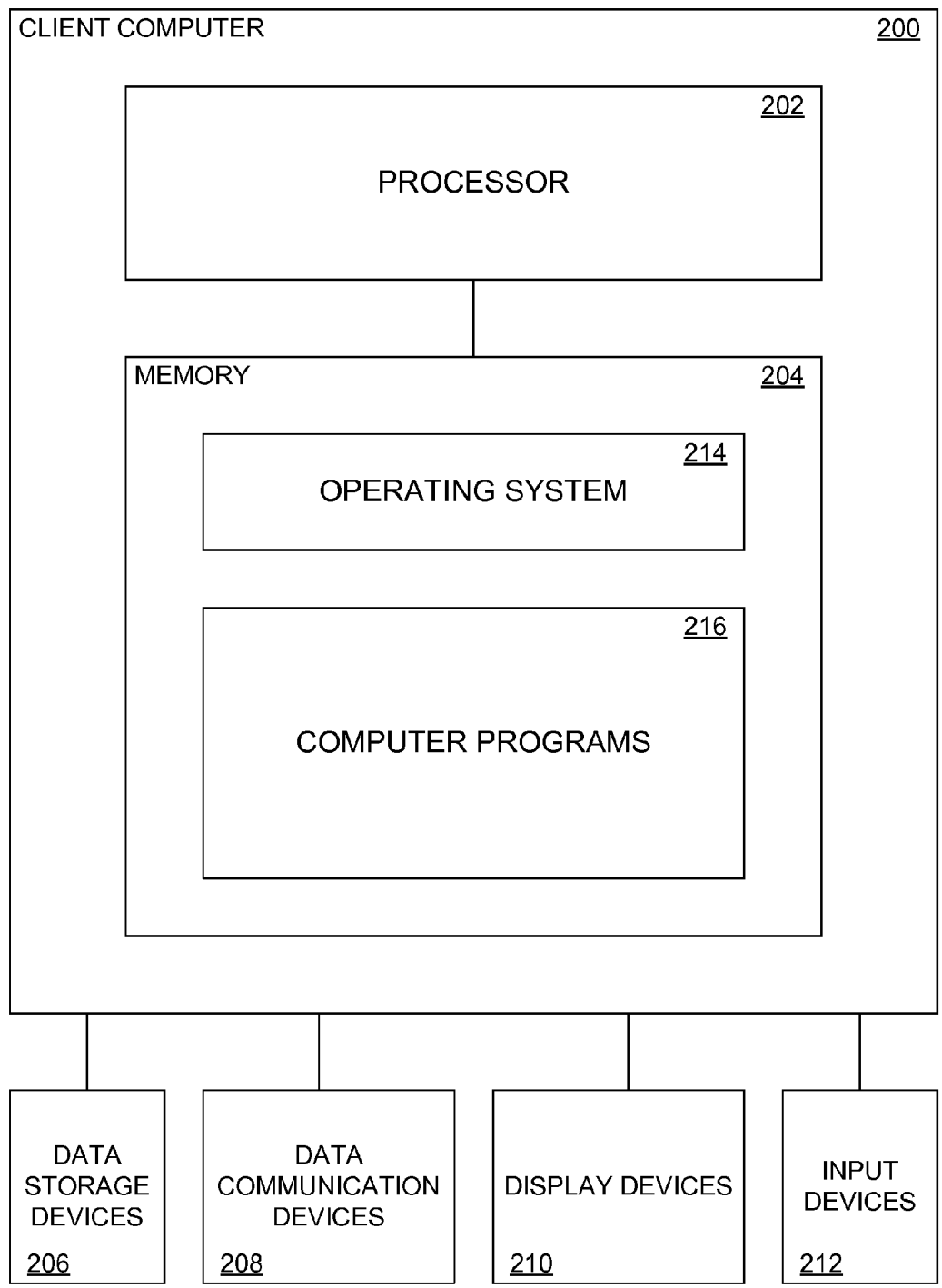
FIG. 2 is a schematic diagram illustrating a hardware environment used to implement a client computer in one embodiment of the invention.

FIG. 2 is a schematic diagram illustrating a hardware environment used to implement a client computer 200 in one embodiment of the invention. The present invention is typically implemented using a client computer 200, which generally includes a processor 202, a random access memory (RAM) 204, data storage devices 206 (e.g., hard, floppy, and/or CD-ROM disk, drives, etc.), data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214. The operating system 214 is booted into the memory 204 of the client computer 200 for execution when the client computer 200 is powered-on or reset. In turn, the operating system 214 then controls the execution of one or more computer programs 216, such as software for reporting when an advertisement has been played/displayed. The present invention is generally implemented in these computer programs 216, which execute under the control of the operating system 214, and cause the client computer 200 to perform the desired functions as described herein.

The operating system 214 and computer programs 216 are comprised of instructions which, when read and executed by the client computer 200, cause the client computer 200 to perform the steps necessary to implement and/or use the present invention. Generally, the operating system 214 and/or computer programs 216 are tangibly embodied in and/or readable from a device, carrier, or media such as memory 204, data storage devices 206, and/or data communications devices 208. Under control of the operating system 214, the computer programs 216 may be loaded from the memory 204, data storage devices 206, and/or data communication devices 208 into the memory 204 of the client computer 200 for use during actual operations.

Thus, the present invention may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention.

Figure 5:
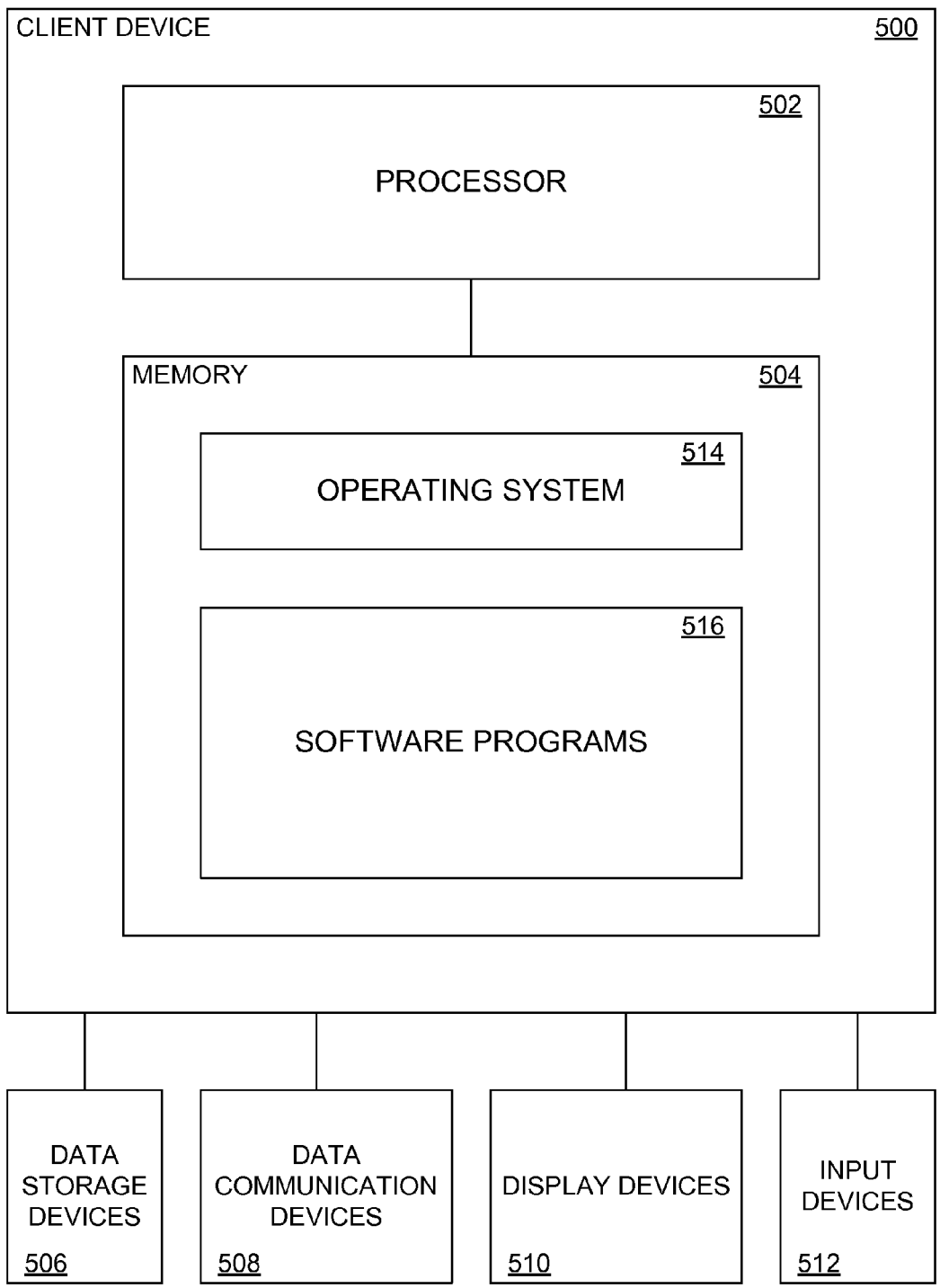
FIG. 5 is a schematic diagram illustrating a hardware environment used to implement a client device in one embodiment of the invention.

FIG. 5 is a schematic diagram illustrating a hardware environment used to implement a client device 500. Client device 500 can be a consumer device, such as an appliance, a personal digital assistant (PDA), a wrist watch, a stand-alone Internet radio, a set top box, or a television system. Client device 500 generally includes a processor 502, a random access memory (RAM) 504, data storage devices 506 (e.g., hard, floppy, and/or CD-ROM disk, drives, etc.), data communications devices 508 (e.g., modems, network interfaces, etc.), display devices 510 (e.g., CRT, LCD display, etc.), and input devices 512 (e.g., mouse pointing device, keyboard, CD-ROM drive, etc.). Other devices, such as read only memory (ROM), a video card, bus interface, printers, etc. can be attached to or included in client device 500. Those skilled in the art will recognize that various combinations of the above components, or any number of different components, peripherals, and other devices, may be used with the client device 500.

Client device 500 operates under control of an operating system (OS) 514. Operating system 514 can be booted into the memory 504 of the client device 500 for execution when the client device 500 is powered-on or reset. In turn, operating system 514 can control the execution of one or more software programs 516, such as software for reporting when an advertisement has been played or displayed. Various embodiments are implemented as software programs 516, which execute under control of operating system 514, and cause client device 500 to perform desired functions, some of which are described herein.

Operating system 514 and software programs 516 include instructions which, when read and executed by client device 500, cause client device 500 to perform operations useful in implementing various embodiments of the present invention. The operating system 514 and software programs 516 can take the form of a computer readable medium, which is readable from a device, carrier, or media such as memory 504, data storage devices 506, data communications devices 508. Under control of the operating system 514, the software programs 516 may be loaded from the memory 504, data storage devices 506, data communication devices 508 into the memory 504 of the client device 500 for use during actual operations.

Thus, various embodiments can be implemented as a method, apparatus or article of manufacture, using standard programming or engineering techniques to produce software, firmware, hardware, or any combination thereof. The term "article of manufacture" (or alternatively, "software program product") as used herein, is intended to encompass a software program accessible from any computer-readable device, carrier, or media. Of course, those skilled in the art will recognize many modifications may be made to this configuration without departing from the scope of the present invention.

Those skilled in the art will also recognize that the environment illustrated in FIG. 5 is not intended to limit the present invention. Indeed, those skilled in the art will recognize that other alternative hardware environments may be used without departing from the scope of the present invention.

Generating a List of Media Options

Figure 3:
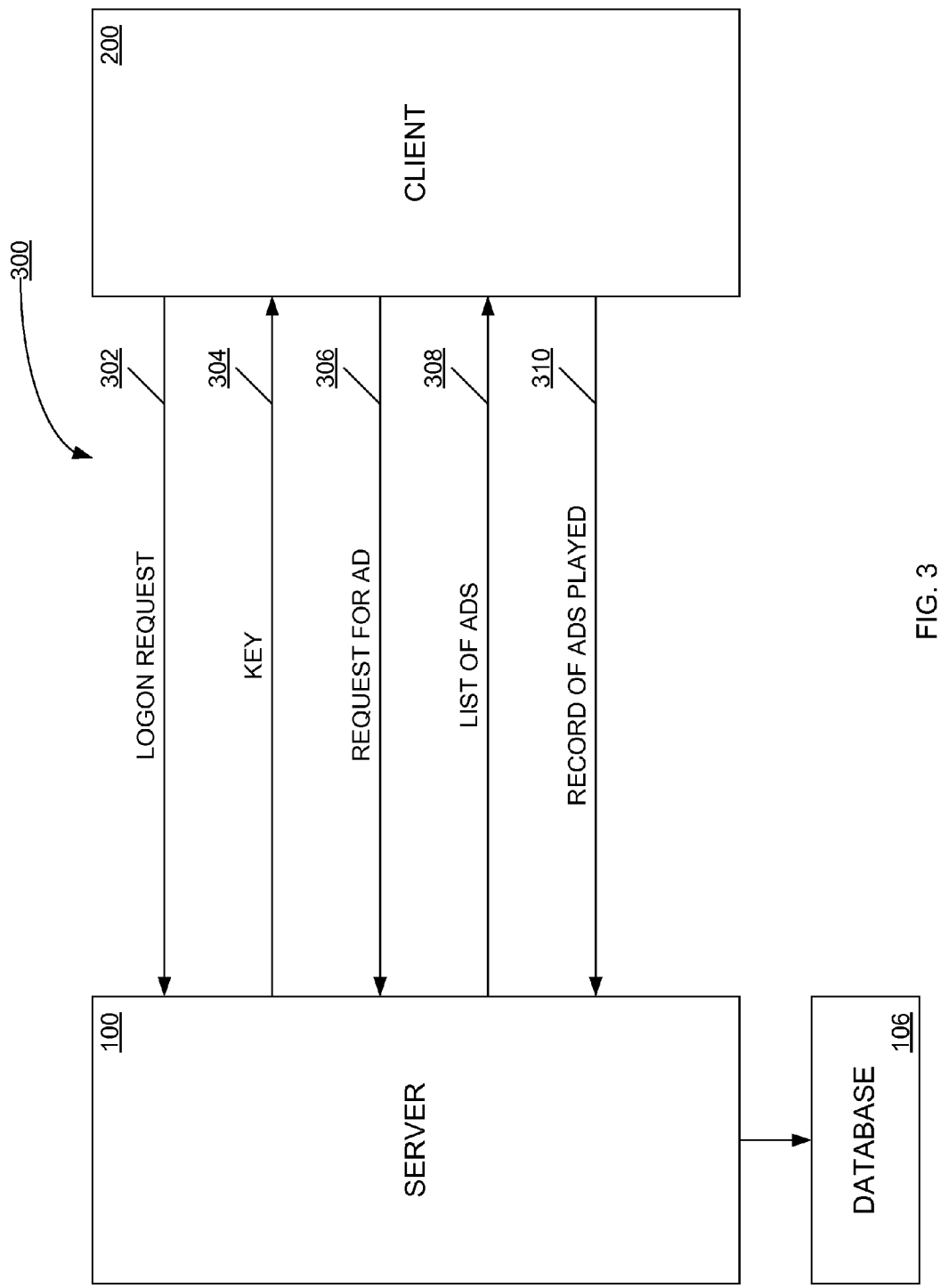
FIG. 3 is a schematic diagram illustrating a client/server computer environment of an embodiment of the present invention.

FIG. 3 is a schematic diagram illustrating a client/server computer environment of an embodiment of the present invention, and more particularly, illustrates a typical distributed computer system 300 using the Internet to connect the server computer 100 to the client computer 200.

The server computer 100 is connected to a database 106 that contains user logon authorization information and information about the available data items. In FIG. 3, the data items are advertisements. Those skilled in the art will recognize that other data items may be used without departing from the scope of the present invention.

The logon authorization information includes client identifiers (e.g., usernames and passwords) for users that are authorized to access the TPAS system. The advertisement information includes, but is not limited to the following: (1) the title of the advertisement; (2) the spot identification number; (3) the flight identification number; (4) the spot Universal Resource Locator (URL); (5) the click action URL; (6) the duration; and (7) the description.

The title of the advertisement provides a descriptive title and the spot identification number is based on the type of advertisement. For example, a banner advertisement may have a different spot identification number than an audio advertisement. The flight identification number is associated with the following: the target audience of an advertisement; the period of time during which a particular advertisement is played/displayed; and the number of times that the advertisement will be played/displayed. The spot URL and the click action URL define the location of the advertisement. The duration defines the time length (e.g., five seconds) of the advertisement. The description contains a written description, possibly provided by the advertiser.

A user at a client computer 200 invokes the TPAS. The user could be a content provider, such as an Internet radio station or a music on demand Web site, or any other Web site that provides content. Alternatively, the user can be a consumer. At the server computer 100, the TPAS system requests the logon authorization information from the user. The logon authorization information includes the user's interface version, client identifier, and GMT time. Arrow 302 represents the client computer 200 sending a logon request to the server computer 100. It is noted that all communication between the client computer 200 and the server 100 computer is in XML, and each communication has a specific header that identifies the content of the communication. For example, the communication may be a logon communication, a request communication, etc.

To determine whether a user is an authorized user, the TPAS system compares the client identifier information with the logon authorization information contained in the database 106. When a match exists, the TPAS returns a limited life span key to the user, as represented by Arrow 304. This limited life span key provides the user with the ability to encrypt data and decipher encrypted data. The limited life span key is active for a predefined time duration (e.g., ten minutes).

The user uses the limited life span key to encrypt and send a request for targeted advertisement options, as represented by Arrow 306. The request contains parameter requirements, including audience demographic requirements and/or content requirements. The audience demographic requirements include, but are not limited to, age, gender, geographic location, interests, education, income, and musical format.

In one embodiment, the location demographic requirement includes the real time location. For example, assume that the content provider seeks to provide an advertisement to someone that is standing in front of a coffee shop. The content provider will then request advertisement options that are related to that particular coffee shop.

The musical format, includes any compressed format (e.g., WMP, WMA, WAV, Real, QT, MP3, Liquid, or Emblaze). Other content requirements include, but are not limited to, spot type, gateway, inserted, audio or video, audio format, file wrapper format, graphic, encoding, encoding rate, and Codec. Exemplary spot types include, but are not limited to, a promotional advertisement, a gateway advertisement, a banner advertisement, a commercial advertisement, or a "jingle."

The TPAS compares the parameter requirements with the advertisement descriptions. The TPAS then uses XML to create a list that contains each advertisement which satisfies the parameter requirements. Each advertisement is tagged (or affixed) with its advertisement information.

Next, the TPAS encrypts the XML list, and returns the encrypted list to the client computer, as represented by Arrow 308. The client computer uses its limited life span key to decrypt the XML list of targeted advertisements.

The user may select one or more targeted advertisements from the list. The user can then purchase the selected, targeted advertisements from any advertisement provider. When the purchased advertisements are played and/or displayed, the client computer sends a XML report to the TPAS, as represented by Arrow 310. The report is a specified XML schema that includes, but is not limited to: the client identification number, the spot identification number, the flight identification number, the start and stop play/display time in GMT, and the number of times that the advertisements was played/displayed.

Figure 6:
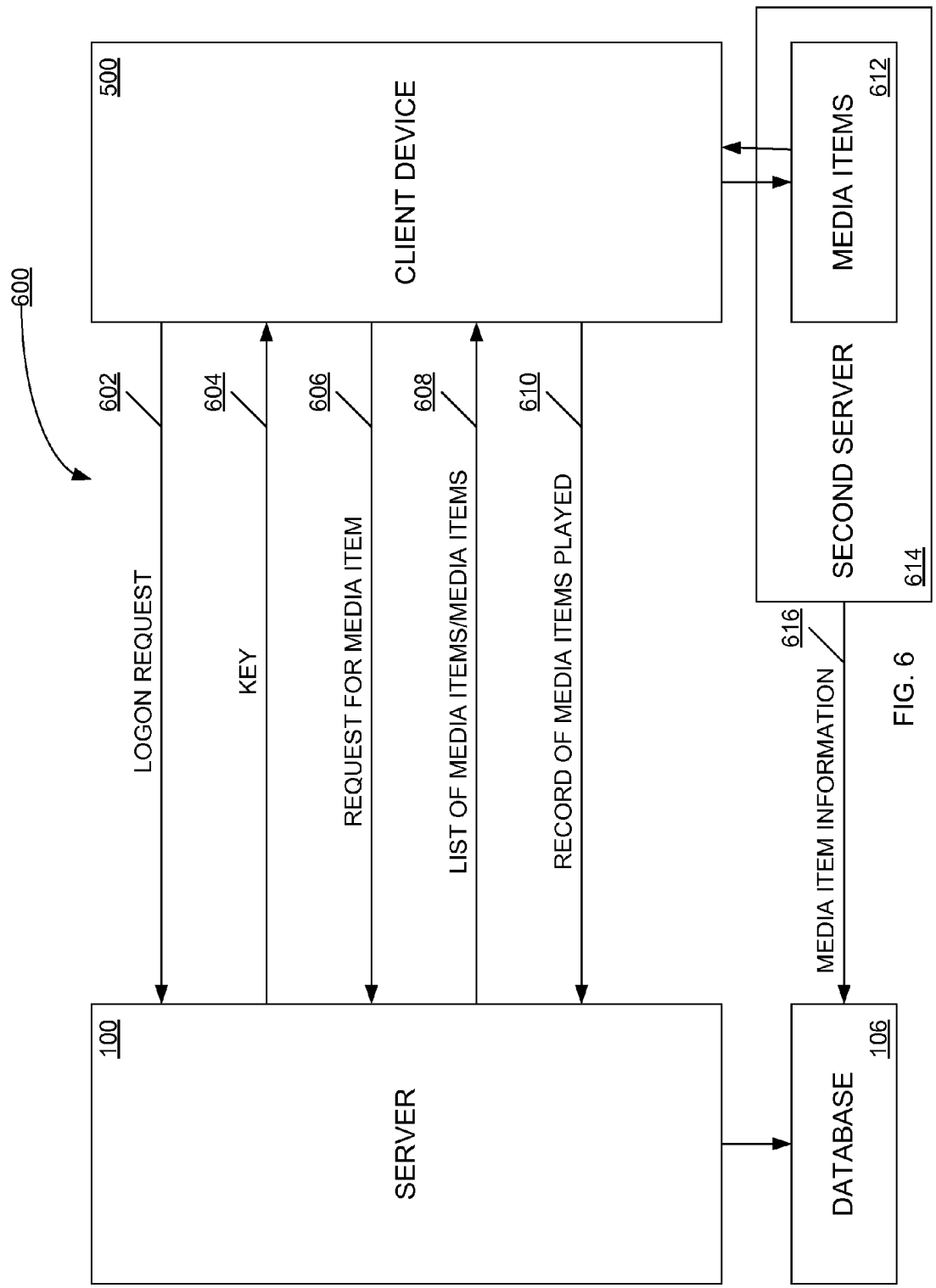
FIG. 6 is a schematic diagram illustrating a client/server computer environment of an embodiment of the present invention.

FIG. 6 is a schematic diagram illustrating a client/server computer environment of an embodiment of the present invention, and more particularly, illustrates a typical distributed computer system 600 using the Internet to connect the server computer 100 to the client device 500.

The server computer 100 is connected to a database 106 that contains user logon authorization information and information about the available data items. In FIG. 6, the data items are media items 612, which are retrieved using a second server 614. The second server 614 can be the server computer 100. Information on media items 612 that are retrieved using second servers 614 other than server computer 100 can be retrieved using the second servers 614 and stored on the database 106. Those skilled in the art will recognize that other data items may be used without departing from the scope of the present invention.

The logon authorization information includes client identifiers (e.g., usernames and passwords) for users that are authorized to access the TPMDS system. The media item information includes, but is not limited to the following: (1) the title of the media item; (2) the media item identification number; (3) the flight identification number; (4) the media item Universal Resource Locator (URL); (5) the click action URL; (6) the duration; and (7) the description.

The title of the media item provides a descriptive title and the media item identification number is based on the type of media. For example, a talk radio program may have a different media item identification number than a music video. The flight identification number is associated with the following: the target audience of a media item; the period of time during which a particular media item is played/displayed; and the number of times that the media item 612 will be played/displayed. The spot URL and the click action URL define the location of the media item 612; they can also define the location of the media item if the media item 612 is to be retrieved using a second server 614 that is not the server computer 100. The duration defines the time length (e.g., ten minutes) of the media item. The description contains a written description, possibly provided by the media provider.

A user at a client device 500 invokes the TPMDS. The user could be a media provider, such as an Internet radio station or a music on demand Web site, or any other Web site that provides media. Alternatively, the user can be a consumer. At the server computer 100, the TPMDS system requests the logon authorization information from the user. The logon authorization information includes the user's interface version, client identifier, and GMT time. Arrow 602 represents the client device 500 sending a logon request to the server computer 100. It is noted that all communication between the client device 500 and the server 100 computer is in XML, and each communication has a specific header that identifies the content of the communication. For example, the communication may be a logon communication, a request communication, etc.

To determine whether a user is an authorized user, the TPMDS system compares the client identifier information with the logon authorization information contained in the database 106. When a match exists, the TPMDS returns a limited life span key to the user, as represented by Arrow 604. This limited life span key provides the user with the ability to encrypt data and decipher encrypted data. The limited life span key is active for a predefined time duration (e.g., ten minutes).

The user uses the limited life span key to encrypt and send a request for targeted media options, as represented by Arrow 606. The request contains parameter requirements, including audience demographic requirements and/or media requirements. The audience demographic requirements include, but are not limited to, age, gender, geographic location, interests, education, income, and musical format.

In one embodiment, the location demographic requirement includes the real time location. For example, assume that the media provider seeks to provide a media item to someone that is living in the state of New York. The media provider will then request media options that are related to the state of New York.

The musical format includes any compressed format (e.g., WMP, Real, QT, MP3, Liquid, or Emblaze). Other media requirements include, but are not limited to, media type, gateway, inserted, audio or video, audio format, file wrapper format, graphic, encoding, encoding rate, and Codec. Exemplary media types include, but are not limited to, an advertisement, a music video, a song, or a radio program.

The TPMDS compares the parameter requirements with the media item information on the database 106. The TPMDS then uses XML to create a list that contains an entry for each media item which satisfies the parameter requirements. Each media item entry is tagged (or affixed) with its media item information. If a media item 612 is to be retrieved using a second server 614 that is not the sever computer 100, the media item information tagged with the media item entry will include the identification of the second server 614 through which the media item 612 is to be retrieved.

Next, the TPMDS encrypts the XML list, and returns the encrypted list to the client device 500, as represented by arrow 608. The client device 500 uses its limited life span key to decrypt the XML list of targeted media item entries.

The user may select one or more targeted media item entries from the list. The user can then purchase or otherwise obtain the selected, targeted media item 612 from any media provider, including those media items located on a second server 614. When the purchased media items 612 are played or displayed, the client computer sends a XML report to the TPMDS, as represented by arrow 610. The report is a specified XML schema that includes, but is not limited to: the client identification number, the media item identification number, the flight identification number, the start and stop play/display time in GMT, and the number of times that the media item was played/displayed.

Figure 4:
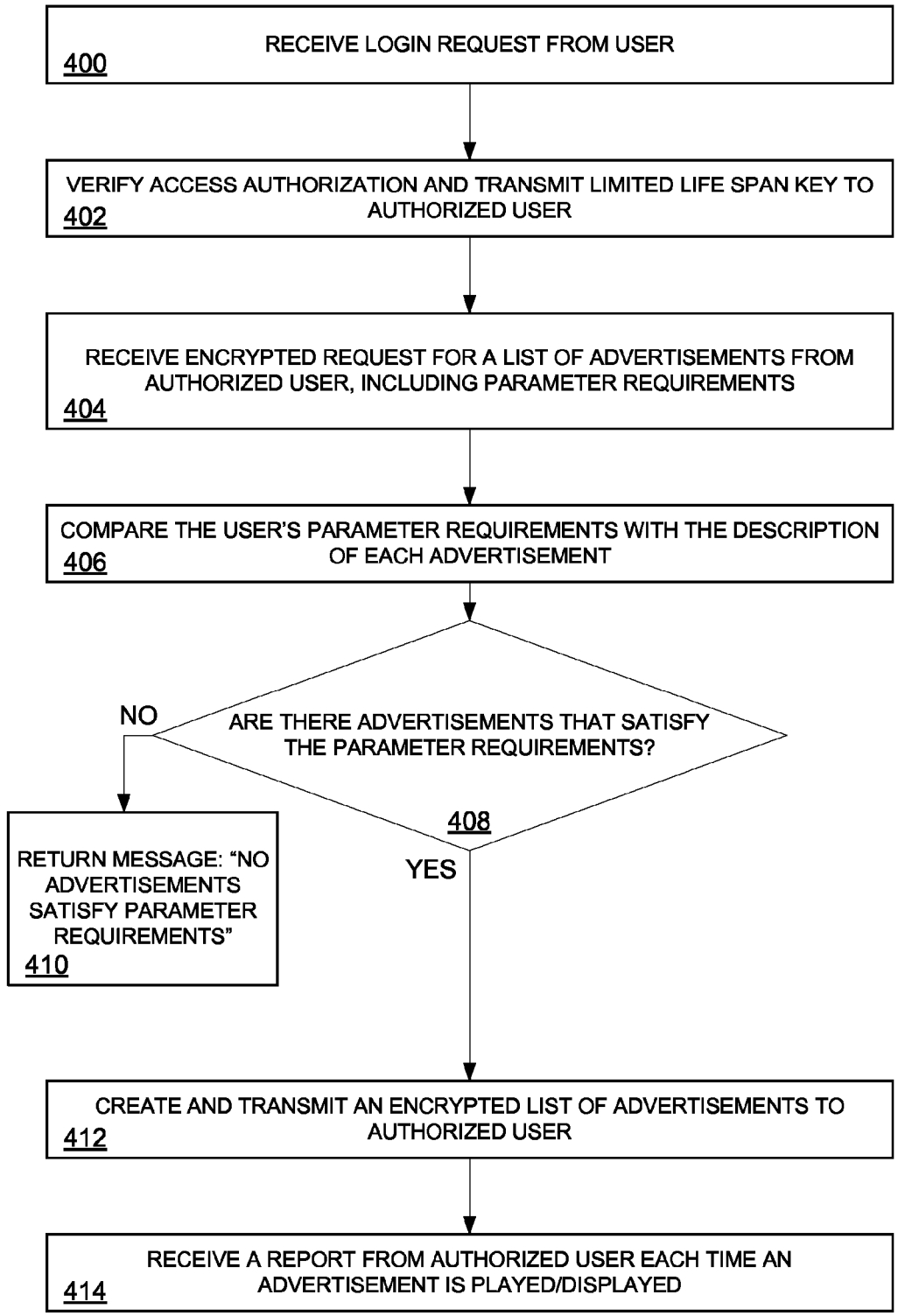
FIG. 4 is a flow diagram illustrating the process performed by the Third Party Advertising System.

FIG. 4 is a flow diagram illustrating the process performed by the TPAS. Block 400 represents the TPAS receiving a logon request from a user. When the user is an authorized user, the TPAS transmits a limited life span encryption key, as represented by Block 402.

Block 404 represents the TPAS receiving an encrypted request for a list of targeted advertisements from the authorized user. The request includes parameter requirements, including audience demographic requirements and content requirements. The TPAS then compares the parameter requirements with the descriptions of each advertisement, as represented by Block 406.

Block 408 is a decision block that represents the TPAS determining whether there are any advertisements that satisfy the parameter requirements. When there are advertisements that satisfy the parameter requirements, the TPAS creates and transmits the list of targeted advertisements to the authorized user, as represented by Block 412. The TPAS then proceeds to Block 414.

Block 414 represents the TPAS system receiving an XML report from the authorized user each time a targeted advertisement is played and/or displayed.

Otherwise, when no advertisements satisfy the parameter requirements, the TPAS returns a message stating that: "no advertisements satisfy the parameter requirements~" as represented by Block 410.

Figure 7:
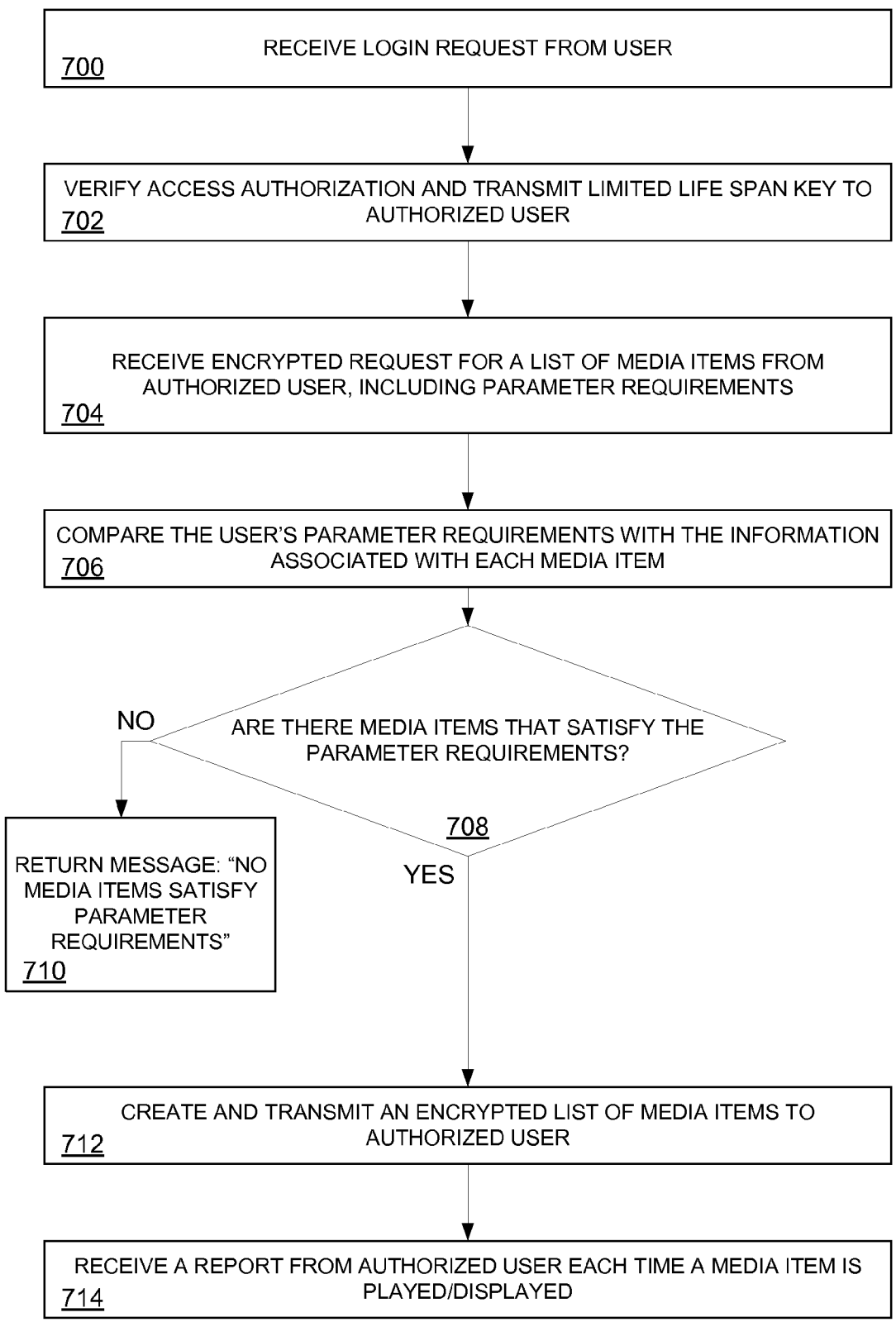
FIG. 7 is a flow diagram illustrating the process performed by the Third Party Media Distribution System.

FIG. 7 is a flow diagram illustrating the process performed by the TPMDS. Block 700 represents the TPMDS receiving a logon request from a user. When the user is an authorized user, the TPMDS transmits a limited life span encryption key, as represented by Block 702.

Block 704 represents the TPMDS receiving an encrypted request for a list of targeted media items from the authorized user. The request includes parameter requirements, including audience demographic requirements and content requirements. The TPMDS then compares the parameter requirements with the descriptions of each media item, as represented by Block 706.

Block 708 is a decision block that represents the TPMDS determining whether there are any media items that satisfy the parameter requirements. When there are media items that satisfy the parameter requirements, the TPMDS creates and transmits the list of targeted media items, including information on the location of the targeted media items, to the authorized user, as represented by Block 712. The TPMDS then proceeds to Block 714.

Block 714 represents the TPMDS system receiving an XML report from the authorized user each time a targeted media item is played and/or displayed.

Otherwise, when no media items satisfy the parameter requirements, the TPMDS returns a message stating that: "no media items satisfy the parameter requirements~" as represented by Block 710.

CONCLUSION

The following describes some alternative or additional embodiments and features. For example, other hardware environments may include without limitation, communications devices, such as appliances, personal digital assistants (PDAs), wrist watches, stand-alone Internet radios, set top boxes, television systems, mainframe computers, minicomputers or personal computers. These may be used in various configurations, such as in a local area network or in conjunction with the Internet. These other environments may work with each other or may work independently.

The foregoing description of the embodiments of the invention has been presented for the purposes of illustration and description. It is not intended to be exhaustive or to limit the invention to the precise from disclosed. Many modifications and variations are possible in light of the above teaching. It is intended that the scope of the invention be limited not by this detailed description, but rather by the claims appended hereto.

What is claimed is:

1. A method comprising:
   receiving, at a server, a first message from a client device, the first message including a request to provide at least one media item matching at least one audience parameter;
   in response to the receiving, accessing a database storing media item information associated with a plurality of media items to be retrieved using a plurality of second servers, wherein the media item information includes a media item identifier, a media item location identifier, and description information;
   selecting a plurality of media items to be retrieved using the plurality of second servers based on a comparison of the at least one audience parameter with the description information; and
   transmitting a second message from the server to the client device, the second message including a listing of the media items to be retrieved using the plurality of second servers, including media item location identifiers associated with each of the plurality of media items.

2. The method of claim 1, wherein at least one of the plurality of second servers is a streaming server.

3. The method of claim 1, wherein the at least one audience parameter includes audience demographic information.

4. The method of claim 3, wherein the at least one audience parameter includes a geographic location of an audience.

5. The method of claim 1, wherein the media item information further includes flight information indicating a number of times a media item is to be presented, the method further comprising:
receiving, at the server, a third message from the client device indicating that the media item has been presented, wherein receiving the third message includes receiving a plurality of unique identifiers based on a selection of media items from the list of media items; and
updating the flight information related to the media item in response to receiving the third message.

6. The method of claim 5, wherein the description information comprises a title and creator of the media item.

7. The method of claim 1, wherein the request to provide at least one media item includes a request for a specific media type.

8. The method of claim 1, wherein the client device is a consumer device.

9. The method of claim 1, wherein the media item location identifier comprises a Universal Resource Locator (URL).

10. The method of claim 1, wherein the media item location identifier identifies at least one of the plurality of second servers upon which the media item is located.

11. The method of claim 1, wherein the description information comprises a time duration.

12. The method of claim 1, wherein the media item identifier indicates a media type of a media item with which the media item identifier is associated.

13. An apparatus comprising:
a processor;
a communications interface;
memory operably associated with the processor;
a program of instructions configured to be stored in the memory and executed by the processor, the program of instructions including:
at least one instruction to receive, at a first server, a first message via the communications interface, the first message including a request to provide a media item matching at least one audience parameter;
at least one instruction to access a database in response to receiving the first message, the database storing media item information associated with a plurality of media items to be retrieved using a plurality of second servers, the media item information includes a media item identifier, a media item location identifier; and description information;
at least one instruction to select a plurality of media items to be retrieved using the plurality of second servers based on a comparison of the at least one audience parameter with the description information; and
at least one instruction to transmit a second message from the first server to a client, the second message including a listing of the plurality of media items to be retrieved using the plurality of second servers, including media item location identifiers associated with each of the plurality of media items.

14. The apparatus of claim 13, wherein the media item information further includes flight information indicating a number of times a media item is to be presented, the program of instructions further comprising:
at least one instruction to receive a third message indicating that the media item has been presented; and
at least one instruction to update the flight information related to the media item in response to receiving the third message.

15. The apparatus of claim 13, wherein the at least one audience parameter includes audience demographic information.

16. The apparatus of claim 15, wherein the audience demographic information includes a geographic location of an audience.

17. The apparatus of claim 13, wherein the media item identifier indicates a media type of a media item with which the media item identifier is associated.

18. A non-transitory computer readable medium tangibly embodying a program of computer executable instructions, the program of instructions comprising:
at least one instruction to receive, at a first server, a first message via a communications interface, the first message including a request to provide information for a media item matching at least one audience parameter;
at least one instruction to access a database in response to receiving the first message, the database storing media item information associated with a plurality of media items to be retrieved using a plurality of second servers, wherein the media item information includes a media item identifier, a media item location identifier; and description information;
at least one instruction to select a plurality of media items based on a comparison of the at least one audience parameter with the description information; and
at least one instruction to transmit a second message from the first server to a client, the second message including a listing of the plurality of media items to be retrieved using the plurality of second servers, including media item location identifiers associated with each of the plurality of media items.

19. The non-transitory computer readable medium of claim 18,
wherein the media item information further includes flight information indicating a number of times a media item is to be presented, the program of instructions further comprising:
at least one instruction to receive, at the first server, a third message indicating that the media item has been presented; and
at least one instruction to update the flight information related to the media item in response to receiving the third message.

20. The non-transitory computer readable medium of claim 18, wherein the media item identifier indicates a media type of a media item with which the media item identifier is associated.

* * * * *